(12) United States Patent
Taubin et al.

(10) Patent No.: US 10,584,963 B2
(45) Date of Patent: Mar. 10, 2020

(54) SYSTEM AND METHODS FOR SHAPE MEASUREMENT USING DUAL FREQUENCY FRINGE PATTERN

(71) Applicant: BROWN UNIVERSITY, Providence, RI (US)

(72) Inventors: Gabriel Taubin, Providence, RI (US); Daniel Moreno, Norwich, CT (US)

(73) Assignee: BROWN UNIVERSITY, Providence, RI (US)

( * ) Notice: Subject to any disclaimer, the term of this patent is extended or adjusted under 35 U.S.C. 154(b) by 4 days.

(21) Appl. No.: 16/019,000

(22) Filed: Jun. 26, 2018

(65) Prior Publication Data

US 2018/0306577 A1    Oct. 25, 2018

Related U.S. Application Data

(62) Division of application No. 14/866,245, filed on Sep. 25, 2015, now abandoned.
(Continued)

(51) Int. Cl.
*H04N 7/18* (2006.01)
*G01B 11/25* (2006.01)
*G06T 7/521* (2017.01)

(52) U.S. Cl.
CPC .......... *G01B 11/2536* (2013.01); *G06T 7/521* (2017.01)

(58) Field of Classification Search
CPC .................................................. G01B 11/2536
(Continued)

(56) References Cited

U.S. PATENT DOCUMENTS 6,438,148 B1 * 8/2002 Hui ...................... H01S 5/1228
                                                                        372/22
9,715,216 B2 * 7/2017 Wiltshire ................. G03H 1/24
(Continued)

OTHER PUBLICATIONS

Zinoviev et al., "Next-Generation Biofuels: Survey of Emerging Technologies and Sustainability Issues", CHEMSUSCHEM, DOI: 10.1002/cssc.201000052, vol. 3, 2010, pp. 1106-1133.
(Continued)

*Primary Examiner* — Leron Beck
(74) *Attorney, Agent, or Firm* — Adler Pollock & Sheehan P.C.

(57) ABSTRACT

A method obtains the shape of a target by projecting and recording images of dual frequency fringe patterns. Locations in each projector image plane are encoded into the patterns and projected onto die target while images are recorded. The resulting images show the patterns superimposed onto the target. The images are decoded to recover relative phase values for the patterns primary and dual frequencies. The relative phases are unwrapped into absolute phases and converted back to projector image plane locations. The relation between camera pixels and decoded projector locations is saved as a correspondence image representing the measured shape of the target. Correspondence images with a geometric triangulation method create a 3D model of the target. Dual frequency hinge patterns have a low frequency embedded into a high frequency sinusoidal, both frequencies are recovered in closed form by the decoding method, thus, enabling direct phase unwrapping.

12 Claims, 12 Drawing Sheets

Related U.S. Application Data

(60) Provisional application No. 62/055,835, filed on Sep. 26, 2014.

(58) Field of Classification Search
USPC .......................................................... 348/135
See application file for complete search history.

(56) References Cited

U.S. PATENT DOCUMENTS

| | | | |
|---|---|---|---|
| 9,791,542 B2* | 10/2017 | Ryan | G01S 5/16 |
| 2005/0094700 A1* | 5/2005 | Ko | G02B 27/0944 |
| | | | 372/98 |
| 2007/0206204 A1* | 9/2007 | Jia | G01B 11/2527 |
| | | | 356/604 |
| 2010/0103486 A1* | 4/2010 | Kroll | G03H 1/02 |
| | | | 359/9 |
| 2012/0154576 A1* | 6/2012 | Weston | G01B 11/007 |
| | | | 348/136 |
| 2014/0018676 A1* | 1/2014 | Kong | A61B 5/015 |
| | | | 600/438 |
| 2015/0070472 A1* | 3/2015 | Chen | G01B 11/2531 |
| | | | 348/47 |

OTHER PUBLICATIONS

Moreno et al., "Embedded Phase Shifting: Robust Phase Shifting with Embedded Signals", The IEEE Conference on Computer Vision and Pattern Recognition, 2015, pp. 2301-2309.

\* cited by examiner

SYSTEM AND METHODS FOR SHAPE MEASUREMENT USING DUAL FREQUENCY FRINGE PATTERN

CROSS REFERENCE TO RELATED APPLICATIONS

This application is a Divisional Application of U.S. patent application Ser. No. 14/866,245, filed Sep. 25, 2015, which claims benefit from U.S. Provisional Patent Application Ser. No. 62/055,835, filed Sep. 26, 2014, which are incorporated by reference in their entireties.

FIELD OF THE TECHNOLOGY

The subject technology relates generally to measuring 3D shapes using structured light patterns, and more particularly, to computing depth values using dual frequency sinusoidal fringe patterns.

BACKGROUND OF THE INVENTION

Structured light methods are widely used as non-contact 3D scanners. Common applications of this technology are industrial inspection, medical imaging, and cultural heritage preservation. These scanners use one or more cameras to image the scene while being illuminated by a sequence of known patterns. One projector and a single camera is a typical setup, where the projector projects a fixed pattern sequence while the camera records one image for each projected pattern. The pattern sequence helps to establish correspondences between projector and camera coordinates. Such correspondences in conjunction with a triangulation method allow recovery of the scene shape. The pattern set determines many properties of a structured light 3D scanner such as precision and scanning time.

A general purpose 3D scanner must produce high quality results for a variety of materials and shapes to be of practical use. In particular, the general purpose 3D scanner must be robust to global illumination effects and source illumination defocus, or measurement errors would render the general purpose 3D scanner unsuitable for scanning non-Lambertian surfaces. Global illumination is defined as all light contributions measured at a surface point not directly received from the primary light source. Common examples are inter-reflections and subsurface scattering. Illumination defocus is caused by the light source finite depth of field. It is known that high frequency structured light patterns are robust to such issues.

However, most existing structured light based scanners are not robust to global illumination and defocus effects, and a few that are robust either use pattern sequences of hundreds of images, or fail to provide a closed form decoding algorithm. In both cases, the existing structured light based scanners cannot measure scene shapes as fast as required by many applications.

SUMMARY

In view of the above, a new shape measurement system and method, based on structured light patterns robust to global illumination effects and source illumination defocus, including fast encoding and decoding algorithms, is required.

The subject technology provides a 3D measurement method and system for real world scenes comprising a variety of materials.

The subject technology has a measurement speed which is significantly faster than existing structured light 3D shape measurement techniques without loss of precision.

The subject technology provides a closed term decoding method of the projected structured light patterns which improves from the state of the art methods.

The subject technology also allows for simultaneous measurements of multiple objects.

One embodiment of the subject technology is directed to a method for measuring shapes using structured light. The method includes encoding light source coordinates of a scene using dual frequency sinusoidal fringe patterns, modulating the light source with the dual frequency sinusoidal fringe patterns, and recording images of the scene while the scene is being illuminated by the modulated light source. The method further includes extracting the coded coordinates from the recorded images by using a closed form decoding algorithm.

Another embodiment of the subject technology is directed to a system for three-dimensional shape measurement including a first module for encoding light source coordinates using dual frequency sinusoidal fringe patterns, a light source for projecting such fringe patterns onto a scene while recording images of the scene under this illumination, a second module for extracting the encoded coordinates from the recorded images, and a third module for computing the scene shape using a geometric triangulation method.

Yet another embodiment of the subject technology is directed to a system for three-dimensional shape measurement including at least one projector, at least one camera, and at least one system processor. The system is configured to generate dual frequency sinusoidal fringe pattern sequences, projecting the generated dual frequency sinusoidal fringe patterns onto a scene, capturing images of the scene illuminated by the dual frequency fringe patterns, and decoding the images to provide for three-dimensional shape measurement of the scene. In a preferred embodiment, the system processor includes one or more GPU's (Graphical Processing Unit).

Still another embodiment of the subject technology is directed to a system for three-dimensional shape measurement of a single object including at least one projector, at least one camera, at least one system processor, and a turntable. The system is configured to generate dual frequency sinusoidal fringe pattern sequences, projecting the generated dual frequency sinusoidal fringe patterns onto a scene, capturing images of the object sitting on top of the turntable illuminated by the fringe patterns. The system includes projecting dual frequency sinusoidal fringe patterns and recording images of the object under this illumination at different rotations of the turntable while keeping the object fixed on top the turntable. The system also includes decoding all recorded images and computing the object shape from all captured turntable rotations and generating a 3D model of the object.

Additional aspects and/or advantages will be set forth in part in the description, and claims which follows and, in part, will be apparent from the description and claims, or may be learned by practice of the invention. No single embodiment need exhibit each or every object, feature, or advantage as it is contemplated that different embodiments may have different objects, features, and advantages.

BRIEF DESCRIPTION OF THE DRAWINGS

For a more complete understanding of the invention, reference is made to the following description and accompanying drawings.

DETAILED DESCRIPTION OF THE PREFERRED EMBODIMENTS

Figure 1A:
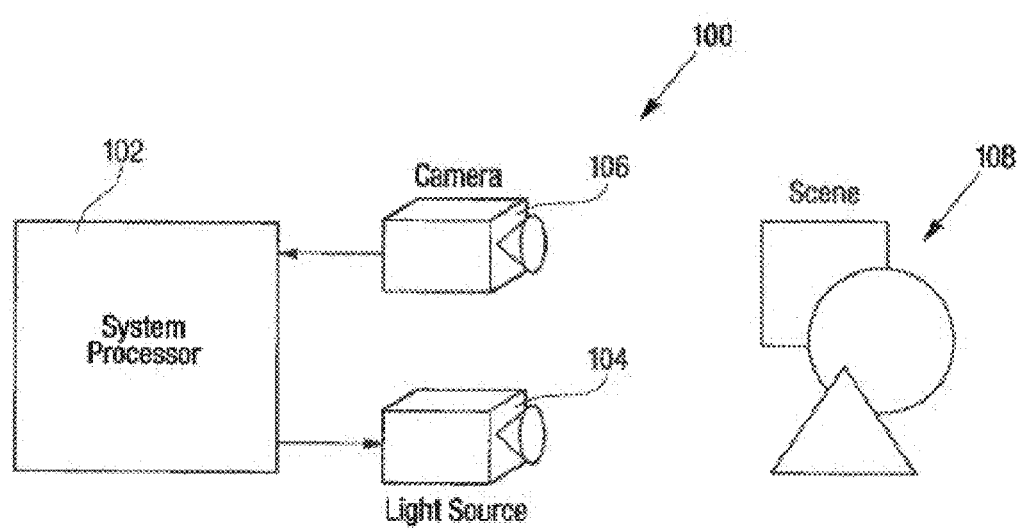
FIG. 1A is a schematic diagram illustrating one embodiment of the shape measurement system.

The subject technology overcomes many of the prior art problems associated with generating 3D models. The advantages, and other features of the technology disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

In brief overview, the subject technology includes a system that obtains the shape of a target object or scene by projecting and recording images of dual frequency sinusoidal fringe patterns. The system determines locations in image planes that are encoded into the dual frequency sinusoidal fringe patterns and projected onto the target while images are being recorded. The resulting images show the dual frequency sinusoidal fringe patterns superimposed onto the target. The images are decoded to recover relative phase values for the dual frequency sinusoidal fringe patterns embedded and pattern frequencies. The relative phases are unwrapped into absolute phases and converted back to projector image plane locations. The relation between camera pixels and decoded projector locations is saved as a correspondence image representing the measured shape of the target. Correspondence images together with a geometric triangulation method create a 3D model of the target. Dual frequency sinusoidal fringe patterns have a low embedded frequency into a high pattern frequency. Both frequencies are recovered in closed form by the decoding method, thus, enabling direct phase unwrapping. The pattern frequencies are also referred to as primary frequencies, and the embedded frequencies are also referred to as dual frequencies, or dual frequency fringe patterns. Only high frequency sinusoidal fringes are visible in the captured images making the result more robust, for example, with respect to source illumination defocus and global illumination effects. Thus, the subject technology is applicable to shape measurement of targets of a variety of materials.

Referring now to FIG. 1A, a schematic diagram illustrates a shape measurement system 100. The shape measurement system 100 includes a system processor 102 connected to a light source 104, such as a projector, and a camera 106. The light source 104 is controlled by the system processor 102 to project fringe patterns onto one or more objects, herein referred to as a scene 108. The camera 106 is controlled by the system processor 102 to record scene images. Both camera 106 and light source 104 are oriented towards the target scene 108 for which the 3D shape is being measured. Preferably, the camera 106, the light source 104, and the scene 108 remain static while the shape measurement is being performed.

Figure 1B:
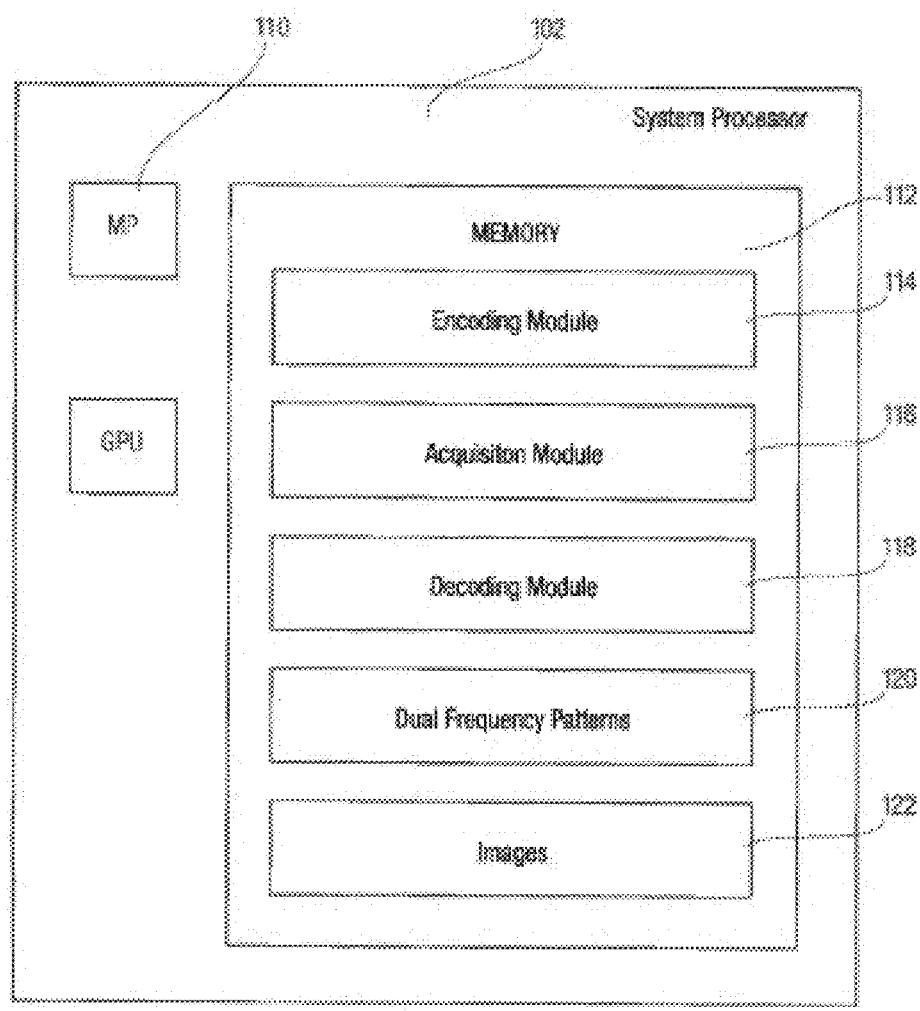
FIG. 1B is a schematic diagram illustrating the system processor of one embodiment of the shape measurement system.

Referring now to FIG. 1B, a schematic diagram illustrating the system processor 102 is shown. As illustration, the system processor 102 typically includes a central processing unit 110 including one or more microprocessors in communication with memory 112 such as random access memory (RAM) and magnetic hard disk drive. An operating system is stored on the memory 112 for execution on the central processing unit 110. A hard disk drive is typically used for storing data, applications and the like utilized by the applications. Although not shown for simplicity, the system processor 102 includes mechanisms and structures for performing I/O operations and other typical functions. It is envisioned that the system processor 102 can utilize multiple servers in cooperation to facilitate greater performance and stability by distributing memory and processing as is well known.

The memory 112 includes several modules for performing the operations of the subject technology. An encoding module 114, an acquisition module 116, and a decoding module 118 all interact with data stored in a dual frequency sinusoidal fringe patterns database 120, an images database, and other places.

The flow charts herein illustrate the structure or the logic of the present technology, possibly as embodied in computer program software for execution on particular device such as the system processor 102 or a modified computer, digital processor or microprocessor. Those skilled in the art will appreciate that the flow charts illustrate the structures of the computer program code elements, including logic circuits on an integrated circuit as the case may be, that function according to the present technology. As such, the present technology may be practiced by a machine component that renders the program code elements in a form that instructs equipment to perform a sequence of function steps corresponding to those shown in the flow charts.

Figure 2:
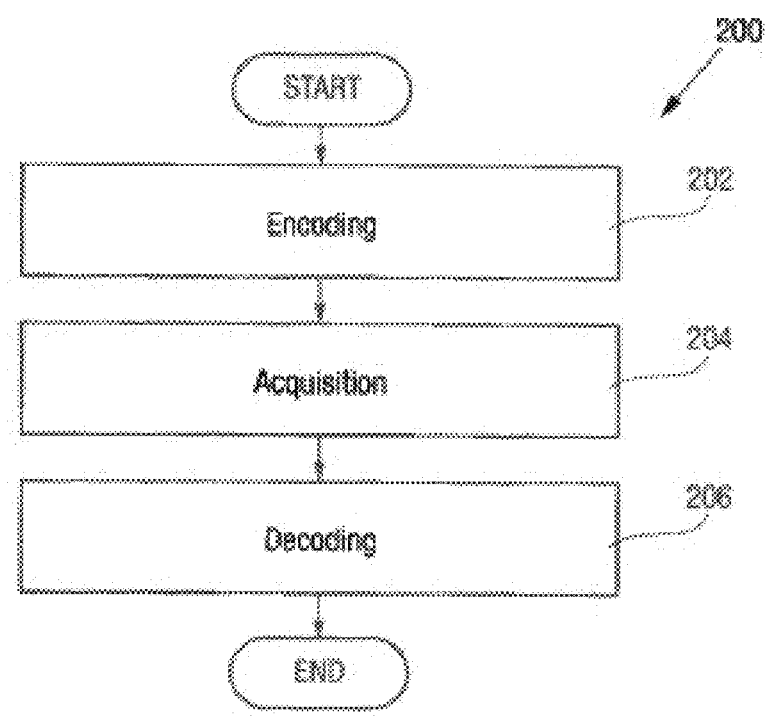
FIG. 2 is a flow chart of a preferred embodiment of the subject technology.

Referring now to FIG. 2, there is illustrated a flowchart 200 depicting a process for measuring the shape of a scene 108. Generally, once the process begins, a set of sinusoidal fringe patterns are generated by the encoding module 114 of the system processor 102 in an encoding step 202. Second, during an acquisition step 204, the light source 104 is used to project the generated patterns, one by one, onto the scene 108. The camera 106 records an image of the scene 108 for each projected fringe pattern which is acquired by the acquisition module 116 for storage. Preferably, the pattern projection and image capture times are synchronized in such a way that a single pattern is projected while each image is being captured. No more than one image is captured during each pattern projection time. Finally, all the captured images are processed by the decoding module 118 in a decoding step 206 to generate a digital representation of the scene 108 related to the measured shape.

Encoding Step 202

Figures 7, 8:
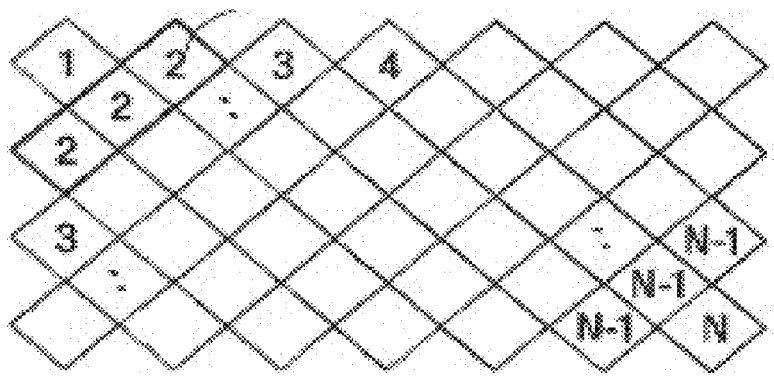
FIG. 7 is an example of index assignment to a square pixel array in accordance with the subject technology.
FIG. 8 is an example of index assignment to a diamond pixel array in accordance with the subject technology.

The encoding step 202 encodes light source coordinates into dual frequency sinusoidal fringe patterns. In a preferred embodiment, the light source 104 projects 2-dimensional grayscale images. In this case, the light source coordinates are integer index values which identify a line in the light source 104 image plane. There exist different pixel array organizations among commercial projectors. FIG. 7 and FIG. 8 are examples of square and diamond pixel arrays respectively. In the square pixel array case, a projector index 720 identifies a pixel column (shown in bold in FIG. 7). In the diamond pixel array case, a projector index 820 identifies a diagonal line from the top-left corner to the bottom-right corner of the array (shown in bold in FIG. 8). The encoding step 202 generates a sequence of 2-dimensional grayscale images where the value at each pixel encodes the corresponding projector index 720 or 820 in the array. Each projector index 720 or 820 is encoded using Equation below where r is an output vector, o and a are constant values. S and A are matrices, T and s are also vectors, p being the projector index 720 or 820.

$$r = o + a\cos(2\pi SATp + 2\pi s)$$

The length of vector r is equal to the number of dual frequency sinusoidal fringe patterns to be generated in the sequence. The first component of r is the encoded pixel value of index p in the first pattern in the sequence, the second component corresponds to the encoded pixel value in the second pattern in the sequence, and so forth. Computing a vector r for each projector index 720 or 820 in the projector pixel array, and filling the image sequence pixel values using the components of r as described concludes the encoding step 202. The output of encoding step 202 is the sequence of images generated. The values required to evaluate the above Equation are explained in detail in the following paragraphs.

Figure 9:
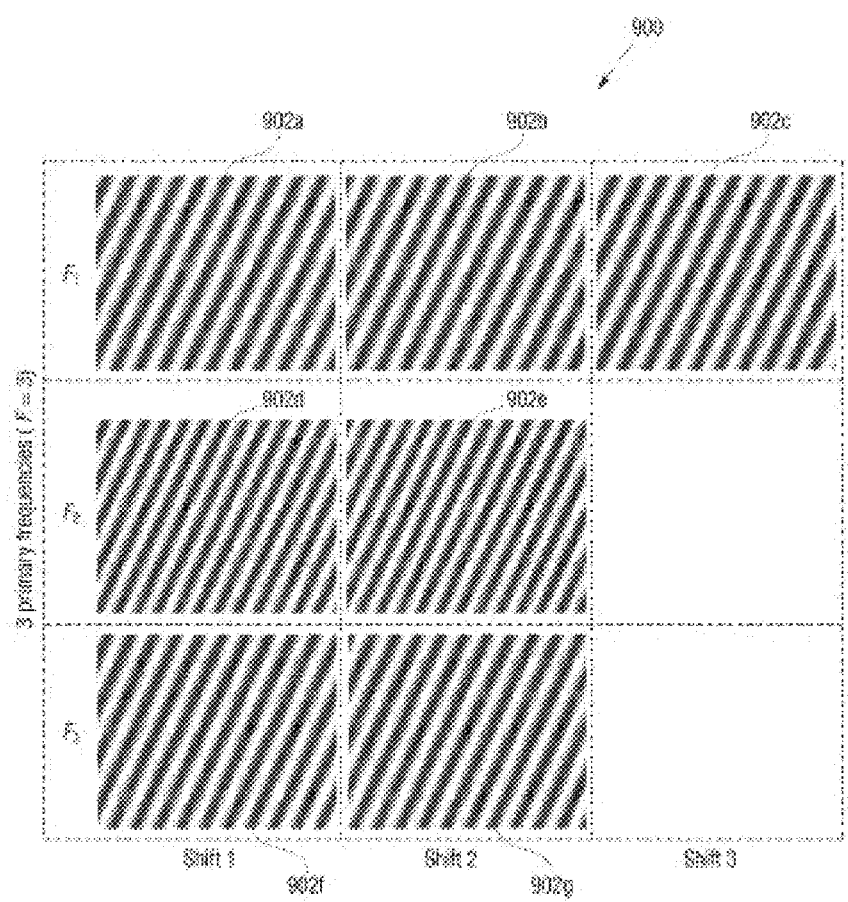
FIG. 9 is an example of a dual frequency pattern sequence in accordance with the subject technology.

Referring now to FIG. 9, a dual frequency sinusoidal fringe pattern sequence 900 is shown. The dual frequency sinusoidal fringe pattern sequence 900 is made of sinusoidal fringe patterns of F primary frequencies and phase shifts of the primary frequencies. A pattern frequency is the spatial frequency of the fringes in the pattern image. Each pattern has also an embedded frequency which is not visible in the image but is extracted by the pattern decode step 602 (see FIG. 6 and operation 1210 in FIG. 12). The value F and the number of shifts are chosen by the designer. However, F should be greater than one. The designer must also choose F real values $\{T_1, T_2, \ldots, T_F\}$ which are used to compute vector T using the equation below. All $T_i$ values must be greater than one. The length of vector T is equal to the number of primary frequencies.

$$T = \left[\frac{1}{T_1}, \frac{1}{T_1 T_2}, \ldots, \frac{1}{T_1 T_2 \ldots T_F}\right]^T \in \mathbb{R}^F$$

Matrix A is a mixing matrix from the equation below. Matrix A has F columns and F rows.

$$A = \begin{bmatrix} 1 & & \\ \vdots & \ddots & \\ 1 & & 1 \end{bmatrix}$$

The designer must also choose a set $\{N_1, N_2, \ldots, N_F\}$ of frequency shifts. Each integer $N_i$ in the set must be equal or greater than 2 and the set must satisfy the equation below, A typical selection is to make $N_1=3$ and $N_i=2$ for $i>1$.

$$N \equiv \sum_{i=1}^{F} N_i \geq 2F + 1$$

In a preferred embodiment vector s is built by stacking altogether the shifts of each frequency as follows: $N_1$ shifts of $F_1$, $N_2$ shifts of $F_2$, and so forth. The length of vectors is N. Let $s_i$ be a vector of length $N_i$ containing the shifts of $F_i$; then, vectors and each $s_i$ are defined as shown in the equation below.

$$s = \begin{bmatrix} s_1 \\ s_2 \\ \vdots \\ s_F \end{bmatrix} \in \mathbb{R}^N, s_i = \begin{bmatrix} \dfrac{0}{\max(N_i, 3)} \\ \dfrac{1}{\max(N_i, 3)} \\ \vdots \\ \dfrac{N_i - 1}{\max(N_i, 3)} \end{bmatrix} \in \mathbb{R}^{N_i}$$

S is a block diagonal matrix matching the shift vector s. Matrix S has F columns and N rows and is given in the equation below.

$$S = \begin{bmatrix} S_1 & & & \\ & S_2 & & \\ & & \ddots & \\ & & & S_F \end{bmatrix}, S_i = \begin{bmatrix} 1 \\ 1 \\ \vdots \\ 1 \end{bmatrix} \in \mathbb{R}_i^N$$

Finally, the offset value a and the amplitude value a are constants proportional to the light source 104 dynamic range. For instance, values o=127 and a=127 would generate patterns images in the range [0, 255].

An example sequence generated using this method is shown in FIG. 9. In the example, the following parameters were used:

$$F=3, T_1=64, T_2=5, T_3=5, =3, N_2=2, N_3=2$$

Still referring to FIG. 9, patterns 902*a-c* are the 3 shifts of the first primary frequency, patterns 902*d*, 902*e* are the 2 shifts of the second primary frequency, and patterns 902*f*, 902*g* are the 2 shifts of the third primary frequency. The 7 patterns 902*a-g* comprise the whole sequence.

Acquisition Step 204

Figure 3:
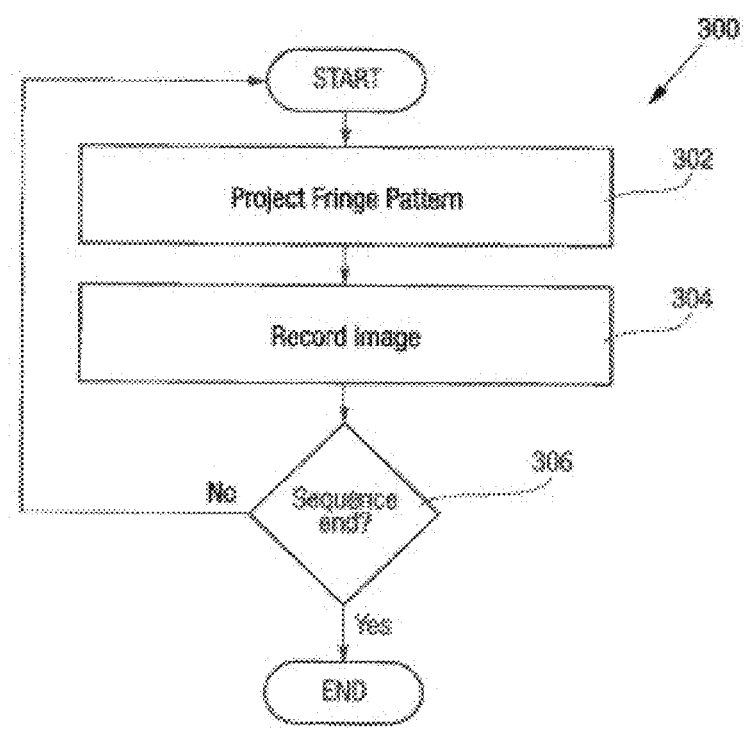
FIG. 3 is a flow chart of the acquisition step of FIG. 2.

Referring again to FIG. 2, the acquisition step 204 is described in more detail below. Referring additionally to FIG. 3, a flowchart 300 implementing the acquisition step 204 is shown. Once started, the light source 104 projects a dual frequency sinusoidal fringe pattern onto the scene 108.

The dual frequency sinusoidal fringe patterns are stored in a dual frequency sinusoidal fringe patterns database 120 in the memory 112. At step 304, the system processor 102 commands the camera 106 to capture one image and saves the image in an image database in the memory 112 for later processing. At step 306, the system processor 102 determines whether the projected pattern is the last in the sequence, in which case the acquisition step 204 ends. If not, the system processor 102 jumps to step 302 and advances to the next pattern in the sequence. In other words, the first time step 302 is executed, the first dual frequency sinusoidal fringe pattern in the sequence is projected; each additional time, the next dual frequency sinusoidal fringe pattern in the sequence is projected.

Figure 4:
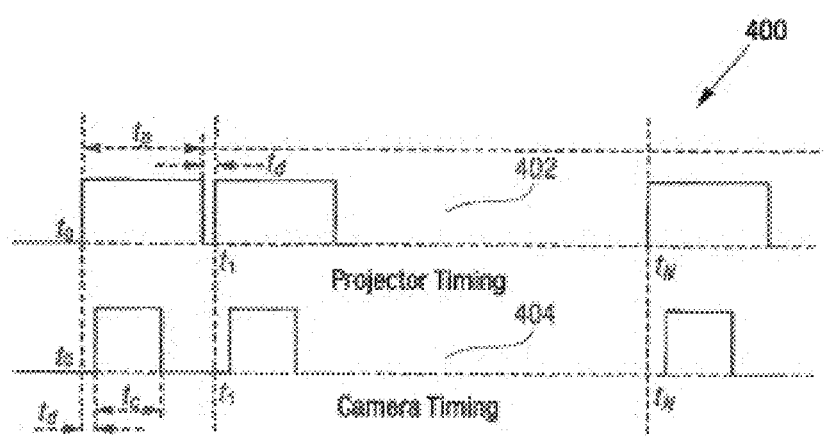
FIG. 4 is a plot of acquisition timings in accordance with the subject technology.

Steps 302 and 304 must be executed with precise timings, as shown graphically in FIG. 4, which illustrates a projector and camera timing plot 400. The timing plot 400 includes the projector timing 402 synchronized with the camera timing 404. The moment that the projection of the first pattern in the sequence begins is designated $t_0$. Each pattern is projected for a period of time p (i.e., projection of the first pattern stops at time+$t_p$). Capture by the camera must begin after a small delay $t_d$ and continue for a time $t_c$ (i.e., the first image capture begins at $t_0$-$t_d$ and finish at $t_0$+$t_d$+$t_c$). Preferably, there is a delay $t_d$ also between the projection end of a pattern and the projection beginning of the next one (i.e., projection of the second pattern begins at $t_1$=$t_0$+$t_p$+$t_d$). The projection start of pattern i=1, 2, . . . , N is computed as $t_i$=$t_0$+(i−1)*($t_p$+$t_d$), image i capture begins at $t_i$+$t_d$ and ends at $t_i$+$t_d$+$t_e$, projection of pattern i finishes at $t_i$+$t_p$.

Figure 10:
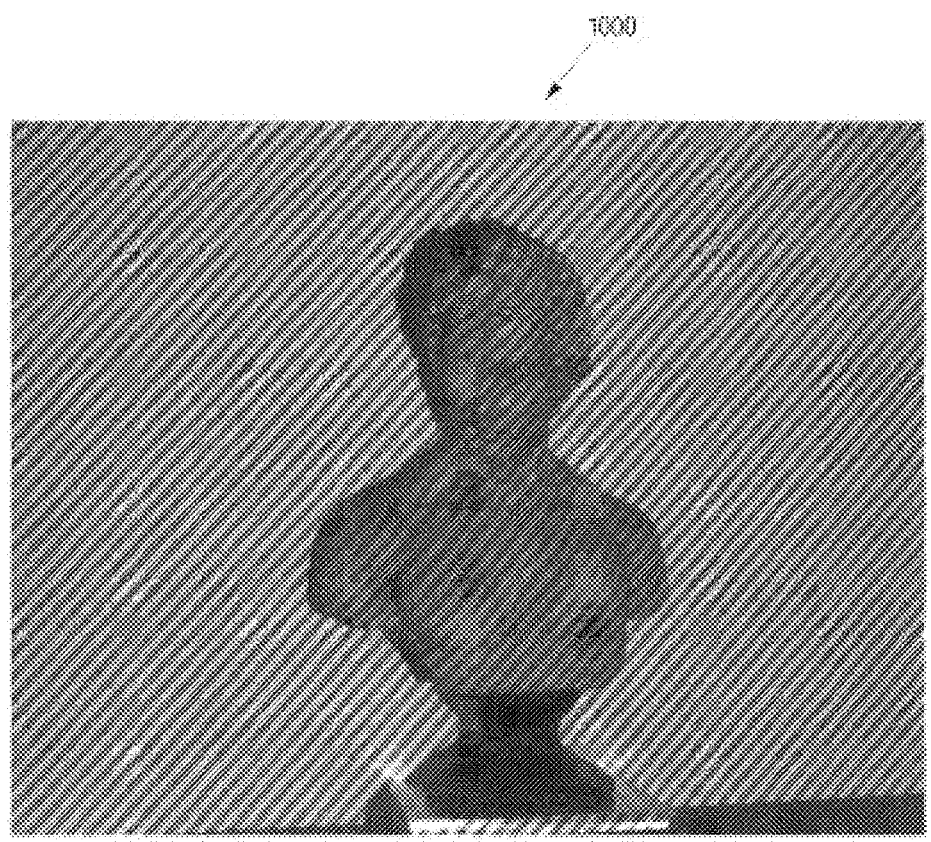
FIG. 10 is an example of an image captured while the scene is illuminated by a dual frequency fringe pattern in accordance with the subject technology.

Referring now to FIG. 10, an exemplary image 1000 captured by acquisition step 204 of a scene 108 by projecting a dual frequency sinusoidal fringe pattern 902a is shown. Such images for dual frequency sinusoidal fringe patterns 902a-g would be saved in image database 122.

Decoding Step 206

Figure 5:
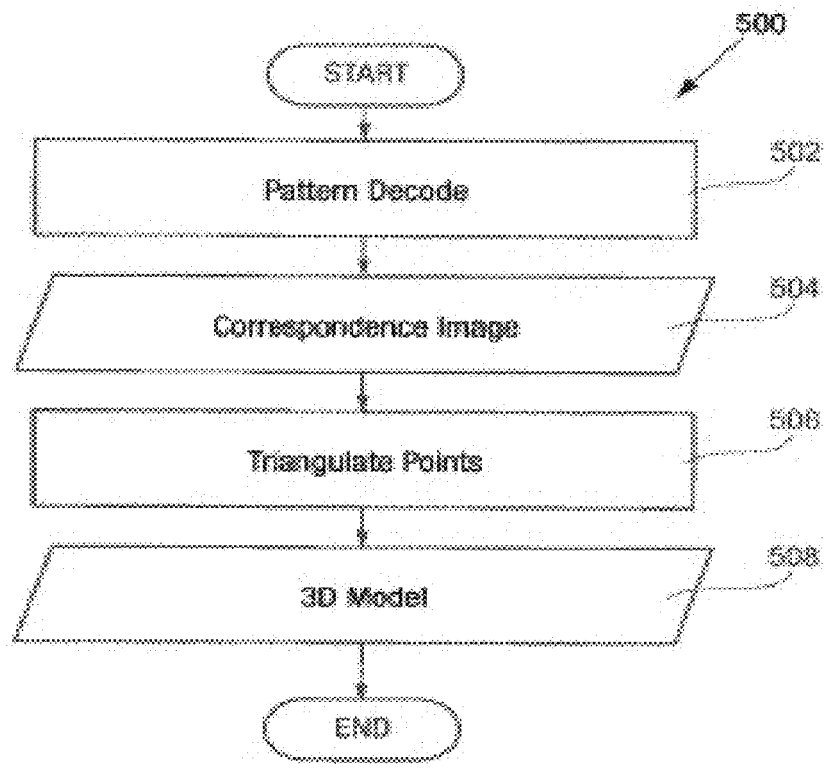
FIG. 5 is a flow chart of the decoding step of FIG. 2.

Referring now to FIG. 5, a flowchart 500 illustrating the details of the decoding step 206 is shown. During the decoding step 206, the system processor 102 processes a set of captured images at step 502 (e.g., pattern decoding), creates a correspondence image at step 504, and a 3D Model at step 508. In a preferred embodiment, the decoding step 206 includes a decoding pattern step 502, and a triangulation step 506.

Figure 6:
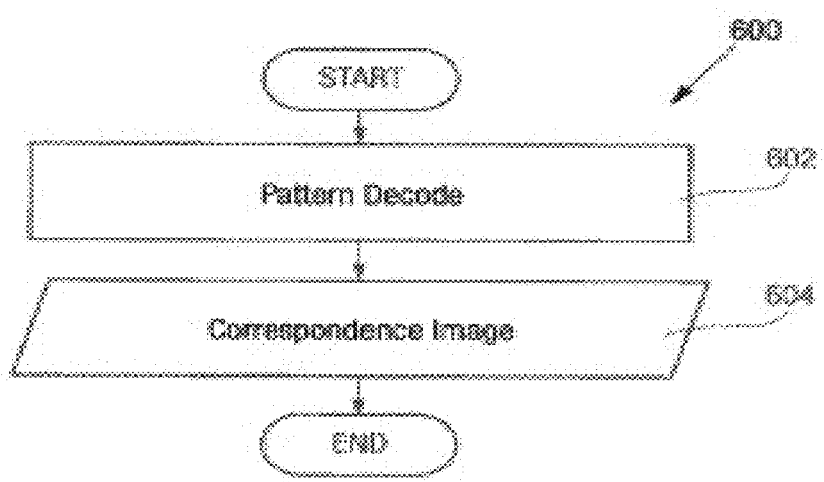
FIG. 6 is a flow chart of the decoding step in an alternative embodiment.

Referring now to FIG. 6, another embodiment implements the decoding step 206 by only performing a decoding pattern step 602 and a correspondence image step 604.

Figure 11:
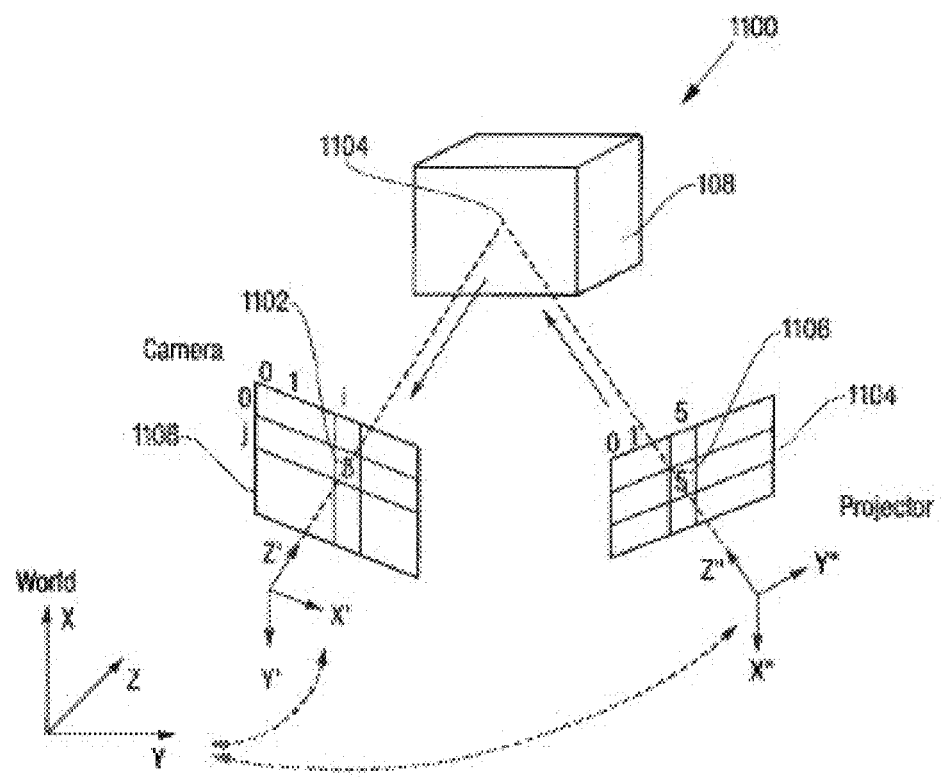
FIG. 11 shows the relation between a correspondence value and a projector index to illustrate the concept of triangulation in accordance with the subject technology.

Referring again to FIG. 5, the correspondence image created at step 504 is a matrix with the same number of columns and rows as the input images. Referring additionally to FIG. 11, an example 1100 of triangulation in accordance with the subject technology is shown. In FIG. 11, the concept of triangulation is shown by the relationship between a correspondence value and a projector index.

Each location in the matrix, called a pixel, contains a correspondence value 1102. As shown in FIG. 11, the example correspondence value 1102 is five. The decoding step 206 creates a correspondence image at step 504 by setting each correspondence value equal to the projector index 720 or 820 (see FIGS. 7 8 and 11), which is the index assigned to the projector pixel of a projector image 1104, which illuminated the point 1104 in the scene 104 imaged by the camera pixel 1102 in the same location as the correspondence value.

In other words with respect to the example in FIG. 11, a scene point 1104 is illuminated by a projector pixel 1106 with a projector index 720 or 820 equal to 5. The same scene point 1104 is being imaged by a camera pixel 1102 in column i and row j. Therefore, the correspondence value 1102 at column i and row j in a correspondence image 1108 of the camera 106 will be set to a value equal to 5. Some pixels in the correspondence image 1108 cannot be assigned to a valid projector index 720 or 820, either because the decoding step 206 cannot identify reliably a corresponding projector pixel, or, because the point imaged at that location is not illuminated by the light source 104. In both of these cases, the correspondence value is set to 'unknown'.

Figure 12:
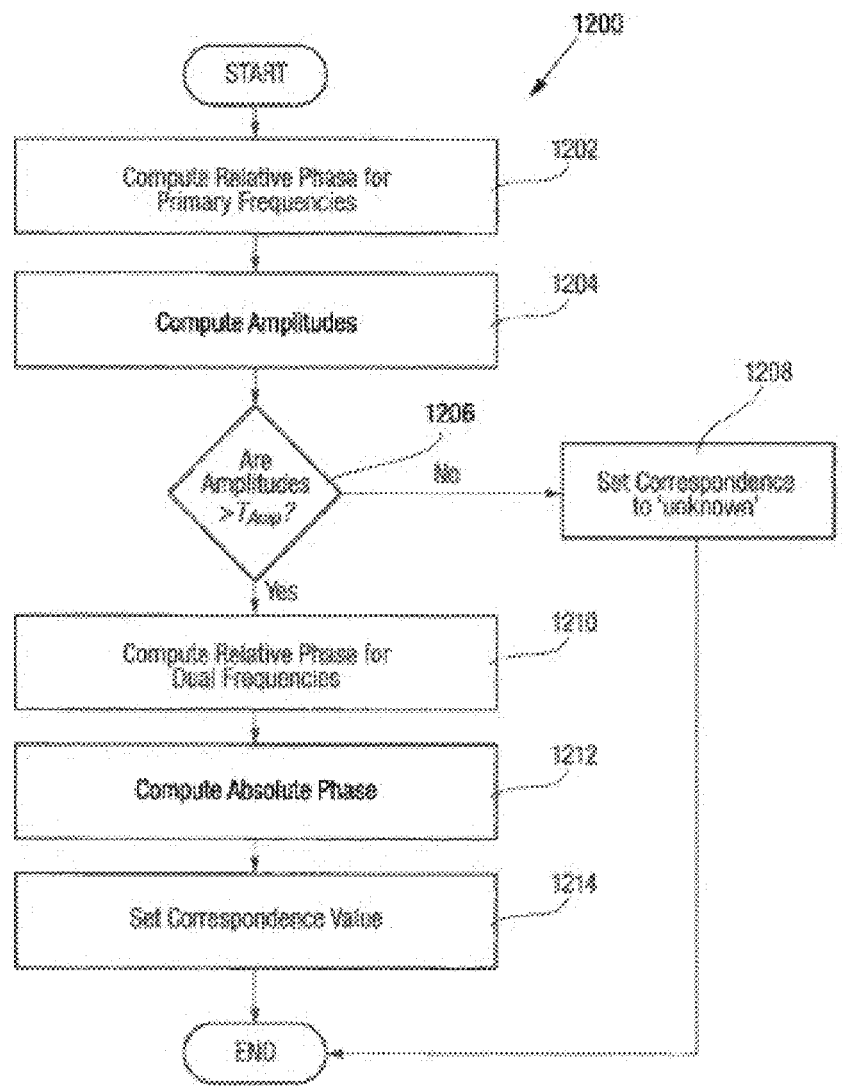
FIG. 12 is a flow chart of single pixel decoding in accordance with the subject technology.

The pattern decode step 502 computes a correspondence value for each pixel in the correspondence image 1108 independently. Referring additionally to FIG. 12, a flowchart 1200 detailing the pattern decode step 502 is illustrated.

Referring to FIG. 12, step 1202 computes a relative phase value for the pattern frequencies, called relative pattern phase. Subsequently step 1210 computes a relative phase value for the embedded frequencies, called relative embedded phase. Additionally step 1212 calculates an absolute phase value. The absolute phase value maps to a projector index.

Referring in more detail to FIG. 12, exemplary logic for generation of each correspondence is shown. The logic of FIG. 12 is executed in parallel by the pattern decode step 502 for each location in the correspondence image of step 504.

At step 1202 the relative pattern phase value for the pattern frequencies is computed by solving the linear system in the equation below, where U and R are vectors and M is a fixed matrix.

$$U = \underset{U}{\operatorname{argmin}} \|R - MU\|$$

Vector R is called radiance vector, a vector built from the pixel values from the captured image set. The length of R is N, the number of images in the set. The first component of the radiance vector has the pixel value at the pixel location being decoded in the first image of the sequence. The second component has the pixel value at the same location in the second image of the sequence, and so forth. The decoding matrix 114 is shown in following equations below. Values F and N, correspond to those used at the encoding step 2020. Matrix M has at least 2F+1 columns and N rows.

$$M = \begin{bmatrix} 1 & M_1 & & & \\ 1 & & M_2 & & \\ \vdots & & & \ddots & \\ 1 & & & & M_F \end{bmatrix}$$

$$M_i = \begin{bmatrix} \cos\left(2\pi \dfrac{0}{\max(N_i, 3)}\right) & -\sin\left(2\pi \dfrac{0}{\max(N_i, 3)}\right) \\ \cos\left(2\pi \dfrac{1}{\max(N_i, 3)}\right) & -\sin\left(2\pi \dfrac{1}{\max(N_i, 3)}\right) \\ \vdots & \vdots \\ \cos\left(2\pi \dfrac{N_i - 1}{\max(N_i, 3)}\right) & -\sin\left(2\pi \dfrac{N_i - 1}{\max(N_i, 3)}\right) \end{bmatrix}$$

At step 1202, the relative pattern phase's co, corresponding to the pattern frequencies are computed from vector U as in the equation below. The notation U(n) means the n-component of U.

$$\omega_i = \tan^{-1}\frac{U(2i+1)}{U(2i+2)}, i:1 \ldots F$$

At step 1204, the system processor 102 computes an amplitude value a for each pattern frequency from vector U using the equation below. At step 1206, each amplitude value $\alpha_i$ is compared with a threshold value $T_{Amp}$. If some of the amplitude values $\alpha_i$ are below $T_{Amp}$, the process proceeds to step 1208. At step 1208, the decoded value is unreliable and the correspondence value is set to 'unknown' for the current pixel, and the decoding process for this location finishes. The threshold value $T_{Amp}$ is set by the designer.

$$\alpha_i = \sqrt{U(2i+1)^2 + U(2i+2)^2}, i:1 \ldots F$$

From step 1206, for the pixel locations where all amplitude value $\alpha_i$ are above $T_{Amp}$ decoding continues to step 1210 by computing relative embedded phase values $\tilde{\omega}_i$ of the embedded frequencies.

$$\tilde{\omega}_1 \equiv \omega_1, \tilde{\omega}_i = \omega_i - \omega_1, i:2 \ldots F$$

The process of calculating an absolute phase value for each relative phase value is called 'phase unwrapping'. A relative phase value is the phase value 'relative' to the current sine period beginning that is a value in [0, 2π]. An absolute phase value is the phase value measured from the origin of the signal. At this point, the sets of relative pattern phase values w and relative embedded phase values $\tilde{\omega}_i$ may be unwrapped using a prior art unwrapping algorithm.

At step 1212, computation of the absolute phase unwraps both the relative pattern phases and the relative embedded phases as follows: relative pattern phases co, and relative embedded phases $\tilde{\omega}_i$ are put all together in a single set and sorted by frequency, renaming $v_0$ the phase corresponding to the lowest frequency and increasing until $v_{2F-1}$, the phase corresponding to the highest frequency. The next equation is applied to obtain the absolute phase values $p_i$ which correspond to the projector indices, $$\begin{cases} k_0 \equiv 0, k_i = \left\lfloor \frac{t_i p_{i-1} - v_i}{2\pi} \right\rfloor & \text{if } i > 0 \\ p_i = \frac{2k_i \pi + v_i}{t_i} \end{cases}$$

In the above equation, the operator $\lfloor \cdot \rfloor$ takes the integer part of the argument, and the values i correspond to the frequency values. Note that the absolute values $p_i$ are computed at subpixel resolution, i.e., with a fractional part, which results in higher resolution in the correspondence and reconstruction phases. The values of the embedded frequencies $F_i$ and the values of the pattern frequencies $f_i$ are given in the following equations, where $f_i$ corresponds to $\omega_i$ and $F_i$ corresponds to $\tilde{\omega}_i$. The value $t_i$ corresponds to the frequency of the relative phase that was renamed to $v_i$.

$$F_i = \begin{cases} 0 & \text{if } i = 1 \\ \frac{1}{T_1 T_2 \ldots T_i} & \text{if } i > 1 \end{cases}$$

$$f_i = \frac{1}{T_1} + F_i$$

The Pattern Decode

Step 502 ends assigning a single projector index 720 or 820 (see FIGS. 7 and 8) to the correspondence value 1102 (see FIG. 11) at the current location in the correspondence image of step 604. In a preferred embodiment, the projector index 720 or 820, is determined at subpixel resolution, as described above, resulting in higher resolution shape reconstruction. The values p unwrapped above are already projector indices, if another unwrapping algorithm is used the absolute phase values must be converted to projector indices dividing them by the corresponding frequency value $t_i$. Two possible ways of getting a single correspondence value from the multiple projector indices are: use the mean p of the indices corresponding to the primary frequencies as in first equation, or, set the correspondence to the index of the highest frequency as in second equation. In FIG. 12, step 1214 sets the correspondence to the index of the highest frequency.

$$p = \frac{1}{F}\sum_{i=F}^{2F-1} p_i$$

$$p = p_{2F-1}$$

The Pattern Decode step 502 of FIG. 5 stops once all pixels in the camera images have been decoded either as projector index values or as 'unknown'. Note that even when projector indices are integer values, correspondence values are usually not integers because the scene point imaged by a camera pixel could be in any place between the discetized projector lines encoded by the indices. The computation of projector indices at subpixel resolution is beneficial, because it results in higher resolution shape reconstruction.

Referring back to FIG. 2, the decoding step 206 continues by using the correspondence image to triangulate points at step 506 of FIG. 5 and generates a 3D Model at step 508 of FIG. 5. Step 506 calculates the intersection of a camera ray and a projector light plane. The camera ray begins at the origin of the camera coordinate system (as shown in FIG. 11) and passes through the current camera pixel center. The projector light plane is the plane that contains the projector line encoded by the projector index 120 and the origin of the projector coordinate system (as shown in FIG. 11).

The camera ray extends in the direction of the scene 108 and intersects the indicated plane exactly on the scene point being imaged by the current camera pixel location as can he seen in FIG. 11. The sought camera ray coincides with the dashed line of the camera light path but it has opposite direction. The projector light plane contains the dashed line representing the projector light path. The intersection 1104 between the projector and camera light paths is on the scene 108. Once the intersection 1104 is calculated, the result is a 3D point which becomes part of the 3D Model of step 508 in FIG. 5. Step 506 performs this intersection for each correspondence index value 1102 with a value different from 'unknown'. After processing all pixel locations the 3D Model of step 508 is complete and the decoding step 206 ends.

Another embodiment of the subject technology assigns two sets of projector indices, one for rows and one for columns, or one set for each of the two diagonal directions. Each of the two sets is encoded, acquired, and decoded as in the preferred embodiment but independently of each other, generating two correspondence images at step 504. At this time, 3D points are generated by computing the 'approximate intersection' of the camera ray, and the ray defined as the intersection the two light planes defined by the two correspondences assigned to each camera pixel location. The approximate intersection is defined as the point which minimizes the sum of the square distances to both rays.

Figure 13:
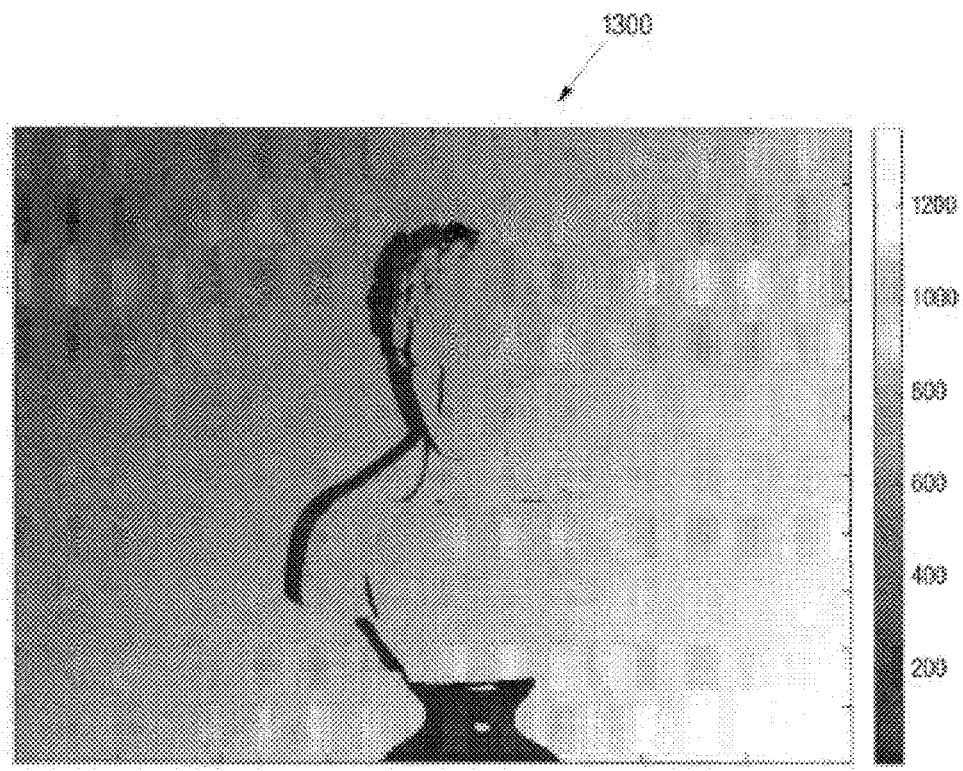
FIG. 13 is an example of a correspondence image generated by the subject technology.
Figure 14:
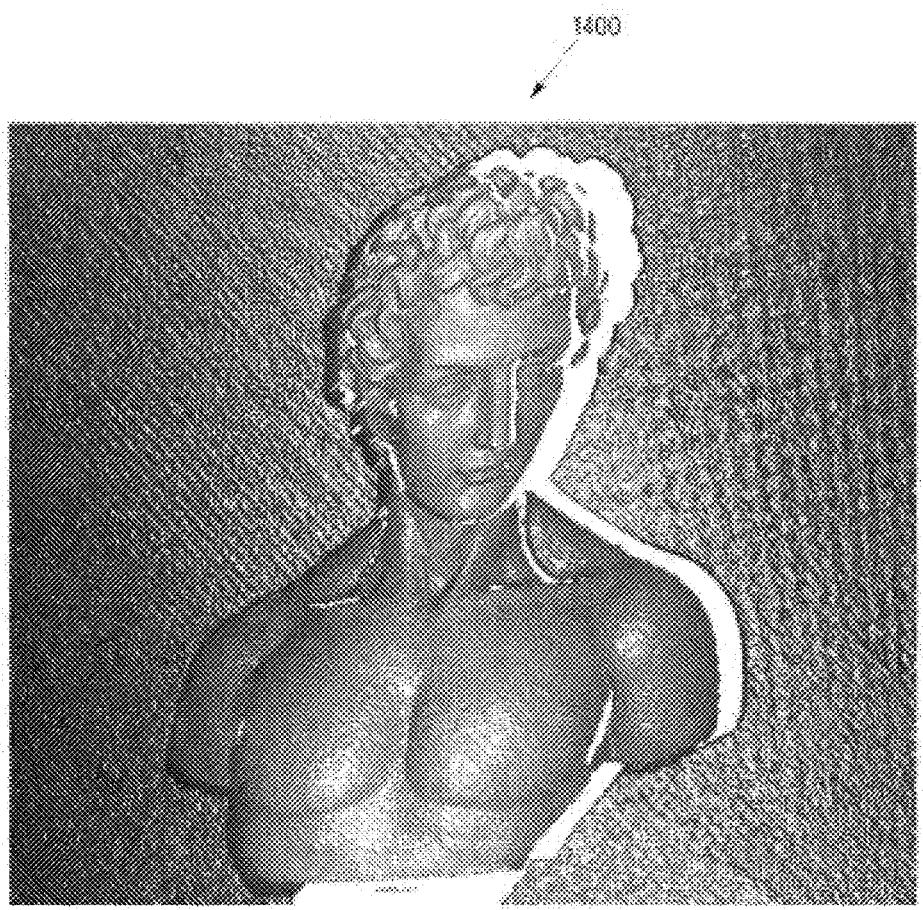
FIG. 14 is an example of 3D model generated by the subject technology.

FIG. 13 is a sample correspondence image 1300 and FIG. 14 shows a sample 3D Model 1400, both generated at the decoding step 206 of FIG. 2.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements (e.g., modules, databases, interfaces, hardware, computers, servers and the like) shown as distinct liar purposes of illustration may be incorporated within other functional elements in a particular implementation.

All patents, patent applications and other references disclosed herein are hereby expressly incorporated in their entireties by reference. While the subject technology has been described with respect to preferred embodiments, those skilled in the art will readily appreciate that various changes and/or modifications can be made to the subject technology without departing from the spirit or scope of the invention as defined by the appended claims.

What is claimed is:

1. A method for obtaining a shape of a target object, the shape comprising three dimensional points, the method comprising the steps of:
    encoding projector locations into a sequence of dual frequency sinusoidal fringe patterns; projecting the sequence of dual frequency sinusoidal fringe patterns onto a target object using an image projector;
    recording a sequence of images of the target object with a camera, the images in the sequence of images being in correspondence with dual frequency sinusoidal fringe patterns in the sequence of dual frequency sinusoidal fringe patterns, each image in the sequence of images being recorded while the corresponding dual frequency sinusoidal fringe pattern is being projected, the camera having camera pixels, each image having an array of pixel values in correspondence with the camera pixels;
    decoding the sequence of images into a set of correspondence pairs, each correspondence pair in the set of correspondence pairs comprising one camera pixel in the camera pixels and one projector location in the projector locations; and
    computing locations of the three dimensional points using a geometric triangulation method.

2. The method of claim 1, wherein the projector comprises projector rows, projector columns, and projector diagonals, and the locations comprise a subset of the projector columns, the projector rows, and the projector diagonals.

3. The methods of claim 1, wherein the step of encoding comprises the steps of:
    choosing a number of frequencies;
    selecting a sequence of period parameters, the length of the sequence of period parameters being equal to the number of frequencies, each period parameter in the sequence of period parameters being a number greater than one;
    deriving a sequence of embedded frequencies from the sequence of period parameters, the length of the sequence of embedded frequencies being equal to the number of frequencies, the embedded frequencies in the sequence of embedded frequencies being in correspondence with the period parameters in the sequence of period parameters, a first embedded frequency in the sequence of embedded frequencies being equal to one divided by the first period parameter in the sequence of period parameters, each subsequent embedded frequency in the sequence of embedded frequencies having a previous embedded frequency, the subsequent embedded frequency being equal to the previous embedded frequency divided by the period parameter corresponding to the subsequent embedded frequency;
    computing a sequence of pattern frequencies, the length of the sequence of pattern frequencies being equal to the number of frequencies, the pattern frequencies in the sequence of pattern frequencies being in correspondence with the embedded frequencies in the sequence of embedded frequencies, a first pattern frequency in the sequence of pattern frequencies being equal to the first embedded frequency, each subsequent pattern frequency in the sequence of pattern frequencies being equal to the result of adding the first embedded frequency to the embedded frequency corresponding to the subsequent pattern frequency;
    selecting a sequence of frequency shift numbers, the length of the sequence of frequency shift numbers being equal to the number of frequencies, a first frequency shift number in the sequence of frequency shift numbers being a positive integer number greater or equal than three; each subsequent frequency shift number in the sequence of frequency shift numbers being a positive integer number greater or equal than two, the sum of all the frequency shift numbers in the sequence of frequency shift numbers being greater or equal than two times the number of frequencies plus one;
    establishing for each embedded frequency in the sequence of embedded frequencies a plurality of frequency shifts, the number of frequency shifts in the plurality of frequency shifts being equal to a corresponding frequency shift number in the sequence of frequency shift numbers;
    initializing the sequence of patterns as an empty sequence;
    creating a dual frequency sinusoidal fringe pattern for each embedded frequency and each frequency shift in the corresponding plurality of frequency shifts, and adding the dual frequency sinusoidal fringe pattern to the sequence of dual frequency sinusoidal fringe patterns.

4. The method of claim 3, wherein the step of decoding comprises the steps of:
    constructing a sequence of shift matrices, the length of the a sequence of shift matrices being equal to the number of frequencies, each shift matrix in the sequence of shift matrices corresponding to one of the pattern frequencies in the sequence of pattern frequencies, the shift matrix having two columns, the shift matrix having a number of rows equal to a corresponding frequency shift number in the sequence of frequency shift numbers, the first column of the shift matrix resulting from concatenating the cosines of a corresponding plurality of frequency shifts, the second column of the shift matrix resulting from concatenating the negative of the sines of a corresponding plurality of frequency shifts;
    constructing a global shift matrix, the number of columns of the global shift matrix being equal to two times the number of frequencies plus one, the number of rows of the shift matrix being equal to the length of the sequence of patterns, the global shift matrix comprising a first column and a block shift matrix, the block shift matrix comprising the all the columns of the global shift matrix except for the first column, all the elements of the first column being equal to one, the block matrix being a block diagonal matrix defined by the shift matrices in the sequence of shift matrices, the block matrix having elements not corresponding to shift matrix elements being equal to zero;

repeating the following steps until all the camera pixels have been decoded; selecting an undecoded camera pixel;

constructing a pixel radiance vector by concatenating the pixel values of the images in the sequence of images corresponding to the camera pixel;

defining a pixel phase vector, the pixel phase vector having dimension equal to two times the number of frequencies plus one, the pixel phase vector comprising a pixel offset and pixel phase pairs, the pixel offset being the first element of the pixel phase vector, the pixel phase pairs being in correspondence with the pattern frequencies;

estimating the pixel phase vector as the minimizer of a phase error energy, the phase error energy being equal to the square norm of a pixel phase difference, the pixel phase difference being computed by subtracting the product of the global shift matrix times the pixel phase vector from the pixel radiance vector;

determining for each pixel phase pair a pattern amplitude as the square root of the sum of the squares of the two elements of the pixel phase pair;

determining for each pixel phase pair a relative pattern phase as an inverse tangent of the ratio of the first element of the pixel phase pair divided by the second element of the pixel phase pair, the inverse tangent further divided by the corresponding pattern frequency;

computing a sequence of relative embedded pattern phases, the length of the sequence of relative embedded pattern phases being equal to the number of frequencies, the sequence of relative embedded pattern phases having a first relative embedded pattern phase, the first relative pattern phase being equal to the corresponding relative pattern phase, each subsequent relative embedded pattern phase in the sequence of relative embedded pattern phases being equal to the result of subtracting the relative pattern phase corresponding to the first relative phase from the relative pattern phase corresponding to the subsequent embedded pattern phase; and determining a projector location for the pixel by temporal phase unwrapping the elements of the sequence of relative embedded phases.

5. The method of claim 4, wherein a point cloud comprises a point color for each three dimensional point.

6. The method of claim 4, wherein a point cloud comprises a surface normal vector for each three dimensional point.

7. A system comprising:
a system processor connected to a light source and a camera, the light source controlled by the system processor to project dual frequency sinusoidal fringe patterns onto a scene having one or more objects, the camera controlled by the system processor to record scene images;
an images database communicatively linked to the system processor; and
the system processor comprising a central processing unit in communication with a memory, the memory including an operating system and a module for shape measurement using dual frequency sinusoidal fringe patterns, the module for shape measurement using dual frequency sinusoidal fringe patterns including at least an encoding module, an acquisition module, and a decoding module, the module for shape measurement using dual frequency sinusoidal fringe patterns comprising a method for obtaining a shape of a target object, the shape comprising three dimensional points, the method for obtaining the shape of the target object comprises the steps of:
encoding projector locations into a sequence of patterns;
projecting the sequence of dual frequency sinusoidal fringe patterns onto a target object using an image projector;
recording a sequence of images of the target object with a camera, the images in the sequence of images being in correspondence with dual frequency sinusoidal fringe patterns in the sequence of dual frequency sinusoidal fringe patterns, each image in the sequence of images being recorded while the corresponding dual frequency sinusoidal fringe pattern is being projected, the camera having camera pixels, each image having an array of pixel values in correspondence with the camera pixels;
decoding the sequence of images into a set of correspondence pairs each correspondence pair in the set of correspondence pairs comprising one camera pixel in the camera pixels and one projector location in the projector locations; and
computing locations of the three dimensional points using a geometric triangulation method.

8. The method of claim 7, wherein the projector comprises projector rows, projector columns, and projector diagonals, and the locations comprise a subset of the projector columns, the projector rows, and the projector diagonals.

9. The methods of claim 7, wherein the step of encoding comprises the steps of:
choosing a number of frequencies;
selecting a sequence of period parameters, the length of the sequence of period parameters being equal to the number of frequencies, each period parameter in the sequence of period parameters being a number greater than one;
deriving a sequence of embedded frequencies from the sequence of period parameters, the length of the sequence of embedded frequencies being equal to the number of frequencies, the embedded frequencies in the sequence of embedded frequencies being in correspondence with the period parameters in the sequence of period parameters, a first embedded frequency in the sequence of embedded frequencies being equal to one divided by the first period parameter in the sequence of period parameters, each subsequent embedded frequency in the sequence of embedded frequencies having a previous embedded frequency, the subsequent embedded frequency being equal to the previous embedded frequency divided by the period parameter corresponding to the subsequent embedded frequency;
computing a sequence of pattern frequencies, the length of the sequence of pattern frequencies being equal to the number of frequencies, the pattern frequencies in the sequence of pattern frequencies being in correspondence with the embedded frequencies in the sequence of embedded frequencies, a first pattern frequency in the sequence of pattern frequencies being equal to the first embedded frequency, each subsequent pattern frequency in the sequence of pattern frequencies being equal to the result of adding the first embedded frequency to the embedded frequency corresponding to the subsequent pattern frequency;

selecting a sequence of frequency shift numbers, the length of the sequence of frequency shift numbers being equal to the number of frequencies, a first frequency shift number in the sequence of frequency shift numbers being a positive integer number greater or equal than three; each subsequent frequency shift number in the sequence of frequency shift numbers being a positive integer number greater or equal than two, the sum of all the frequency shift numbers in the sequence of frequency shift numbers being greater or equal than two times the number of frequencies plus one;

establishing for each embedded frequency in the sequence of embedded frequencies a plurality of frequency shifts, the number of frequency shifts in the plurality of frequency shifts being equal to a corresponding frequency shift number in the sequence of frequency shift numbers;

initializing the sequence of dual frequency sinusoidal fringe patterns as an empty sequence;

creating a dual frequency sinusoidal fringe pattern for each embedded frequency and each frequency shift in the corresponding plurality of frequency shifts, and adding the dual frequency sinusoidal fringe pattern to the sequence of dual frequency sinusoidal fringe patterns.

10. The method of claim 9, wherein the step of decoding comprises the steps of:

constructing a sequence of shift matrices, the length of the a sequence of shift matrices being equal to the number of frequencies, each shift matrix in the sequence of shift matrices corresponding to one of the pattern frequencies in the sequence of pattern frequencies, the shift matrix having two columns, the shift matrix having a number of rows equal to a corresponding frequency shift number in the sequence of frequency shift numbers, the first column of the shift matrix resulting from concatenating the cosines of a corresponding plurality of frequency shifts, the second column of the shift matrix resulting from concatenating the negative of the sines of a corresponding plurality of frequency shifts;

constructing a global shift matrix, the number of columns of the global shift matrix being equal to two times the number of frequencies plus one, the number of rows of the shift matrix being equal to the length of the sequence of patterns, the global shift matrix comprising a first column and a block shift matrix, the block shift matrix comprising the all the columns of the global shift matrix except for the first column, all the elements of the first column being equal to one, the block matrix being a block diagonal matrix defined by the shift matrices in the sequence of shift matrices, the block matrix having elements not corresponding to shift matrix elements being equal to zero;

repeating the following steps until all the camera pixels have been decoded; selecting an undecoded camera pixel;

constructing a pixel radiance vector by concatenating the pixel values of the images in the sequence of images corresponding to the camera pixel;

defining a pixel phase vector, the pixel phase vector having dimension equal to two times the number of frequencies plus one, the pixel phase vector comprising a pixel offset and pixel phase pairs, the pixel offset being the first element of the pixel phase vector, the pixel phase pairs being in correspondence with the pattern frequencies;

estimating the pixel phase vector as the minimizer of a phase error energy, the phase error energy being equal to the square norm of a pixel phase difference, the pixel phase difference being computed by subtracting the product of the global shift matrix times the pixel phase vector from the pixel radiance vector;

determining for each pixel phase pair a pattern amplitude as the square root of the sum of the squares of the two elements of the pixel phase pair;

determining for each pixel phase pair a relative pattern phase as an inverse tangent of the ratio of the first element of the pixel phase pair divided by the second element of the pixel phase pair, the inverse tangent further divided by the corresponding pattern frequency;

computing a sequence of relative embedded pattern phases, the length of the sequence of relative embedded pattern phases being equal to the number of frequencies, the sequence of relative embedded pattern phases having a first relative embedded pattern phase, the first relative pattern phase being equal to the corresponding relative pattern phase, each subsequent relative embedded pattern phase in the sequence of relative embedded pattern phases being equal to the result of subtracting the relative pattern phase corresponding to the first relative phase from the relative pattern phase corresponding to the subsequent embedded pattern phase; and determining a projector location for the pixel by temporal phase unwrapping the elements of the sequence of relative embedded phases.

11. The method of claim 10, wherein a point cloud comprises a point color for each three dimensional point.

12. The method of claim 10, wherein a point cloud comprises a surface normal vector for each three dimensional point.

* * * * *